(12) United States Patent
He (10) Patent No.: US 11,893,891 B2
(45) Date of Patent: Feb. 6, 2024

(54) METHOD FOR CALCULATING TIME TO COLLISION FOR OBJECT AND VEHICLE, CALCULATION DEVICE AND VEHICLE

(71) Applicant: OmniVision Sensor Solution (Shanghai) Co., Ltd, Shanghai (CN)

(72) Inventor: Qisheng He, Shanghai (CN)

(73) Assignee: OMNIVISION SENSOR SOLUTION (SHANGHAI) CO., LTD, Shanghai (CN)

(*) Notice: Subject to any disclaimer, the term of this patent is extended or adjusted under 35 U.S.C. 154(b) by 558 days.

(21) Appl. No.: 17/151,242

(22) Filed: Jan. 18, 2021

(65) Prior Publication Data

US 2021/0142677 A1   May 13, 2021

Related U.S. Application Data

(63) Continuation of application No. PCT/CN2018/095770, filed on Jul. 16, 2018.

(51) Int. Cl.
*G08G 1/16* (2006.01)
*B60W 50/00* (2006.01)
(Continued)

(52) U.S. Cl.
CPC ......... *G08G 1/166* (2013.01); *B60W 50/0097* (2013.01); *G06V 10/25* (2022.01);
(Continued)

(58) Field of Classification Search
CPC .......... G08G 1/166; G08G 1/04; G08G 1/052; G08G 1/056; B60W 50/0097;
(Continued)

(56) References Cited

U.S. PATENT DOCUMENTS

2007/0069872 A1   3/2007 Arakawa et al.
2018/0107883 A1*  4/2018 Viswanath ............ G06V 20/58

FOREIGN PATENT DOCUMENTS

CN   101734214 A   6/2010
CN   103500518 A   1/2014
(Continued)

OTHER PUBLICATIONS

Censi et al.; Low-Latency Event-Based Visual Odometry; 2014 IEEE International Conference on Robotics & Automation (ICRA) Hong Kong Convention and Exhibition Center May 31-Jun. 7, 2014. Hong Kong, China (Year: 2014).*

(Continued)

*Primary Examiner* — Michael J Zanelli
(74) *Attorney, Agent, or Firm* — IPRO, PLLC (57) ABSTRACT

The present disclosure provides a method for calculating a TTC for an object and a vehicle for a calculation device, including: generating a timestamp matrix in accordance with a series of event data from a DVS coupled to the vehicle; scanning events in the timestamp matrix in a predetermined scanning direction, so as to calculate a time gradient of each event in the predetermined scanning direction; creating at least one subset consisting of a first quantity of consecutive events in the predetermined scanning direction and each with a positive time gradient; calculating a spatial position of each event in each subset in accordance with intrinsic and extrinsic parameter matrices of the DVS; and calculating the TTC in accordance with the spatial position and the timestamp of each event in the subset. The present disclosure further provides the calculation device and a corresponding vehicle.

17 Claims, 6 Drawing Sheets

(51) Int. Cl.
*G08G 1/04* (2006.01)
*G08G 1/052* (2006.01)
*G08G 1/056* (2006.01)
*G06V 20/58* (2022.01)
*G06V 10/25* (2022.01)

(52) U.S. Cl.
CPC ............ *G06V 20/58* (2022.01); *G08G 1/04* (2013.01); *G08G 1/052* (2013.01); *G08G 1/056* (2013.01); *B60W 2554/4042* (2020.02); *B60W 2554/4043* (2020.02); *B60W 2554/80* (2020.02)

(58) Field of Classification Search
CPC . B60W 2554/4042; B60W 2554/4043; B60W 2554/80; G06V 10/25; G06V 20/58
See application file for complete search history.

(56) References Cited

FOREIGN PATENT DOCUMENTS

| | | | | |
|---|---|---|---|---|
| CN | 105679096 A | | 6/2016 | |
| EP | 2463843 A2 | * | 6/2012 | ......... G06K 9/00362 |
| JP | 2013097676 A | * | 5/2013 | ............... G06K 9/00 |

OTHER PUBLICATIONS

Kiricarslan et al.; Direct Vehicle Collision Detection from Motion in Driving Video; 2017 IEEE Intelligent Vehicles Symposium (IV) Jun. 11-14, 2017, Redondo Beach, CA, USA (Year: 2017).*

Schaub et al.; Spatio-Temporal Prediction of Collision Candidates for Static and Dynamic Objects in Monocular Image Sequences; 2013 IEEE Intelligent Vehicles Symposium (IV) Jun. 23-26, 2013, Gold Coast, Australia (Year: 2013).*

* cited by examiner

METHOD FOR CALCULATING TIME TO COLLISION FOR OBJECT AND VEHICLE, CALCULATION DEVICE AND VEHICLE

TECHNICAL FIELD

The present disclosure relates to the field of autonomous driving technology, in particular to a method for calculating a Time to Collision (TTC) for an object and a vehicle, a calculation device, and the vehicle.

BACKGROUND

Forward collision warning is a basic function for autonomous driving/advanced driver assistance. TTC is an important index for evaluating a risk level of forward collision, and a probability of potential forward collision may be determined in accordance with a TTC value during the drive. Hence, the calculation of the TTC in a rapid and accurate manner is crucial to the safe driving.

In a conventional TTC calculation method, at least three images are acquired by a conventional camera, a vehicle is identified in these images and marked with a rectangular box, then a distance is calculated in accordance with information about corners and sides of the rectangular box, and then a relative speed and relative acceleration are calculated in accordance with distance information and a frame rate of the camera, so as to acquire the TTC. However, there are many problems in the conventional TTC calculation method. (1) The images are acquired by the conventional camera at a limited speed, and usually it takes a relatively long time to acquire a plurality of high-definition images. (2) Usually, it is insufficiently accurate to calculate the distance and the speed in accordance with the information about the corners and sides of the rectangular box, because it is impossible for the rectangular box to perfectly reflect a size, a position and the speed of the vehicle, i.e., the rectangular box may be too small (insufficient vehicle information is contained in the rectangular box) or the rectangular box may be too large (excessive background information is contained in the rectangular box). (3) In a conventional image processing method, a relatively large quantity of background information needs to be processed, so a large quantity of resources are occupied and thereby a warning response speed may be adversely affected. In a word, the conventional TTC calculation method is less efficient and accurate, and it is unsuitable for a scenario where the vehicle moves at a high speed and the response speed is highly demanded, e.g., the forward collision warning.

Hence, there is an urgent need to provide a scheme for calculating the TTC in a rapid and accurate manner, so as to meet the requirements in the scenarios, e.g., a high-speed movement scenario.

SUMMARY

An object of the present disclosure is to provide a scheme for calculating a TTC for an object and a vehicle, so as solve, or at least relieve, the above-mentioned problem.

In one aspect, the present disclosure provides in some embodiments a method for calculating a TTC for an object and a vehicle for a calculation device, including: generating a timestamp matrix in accordance with a series of event data from a Dynamic Vision Sensor (DVS) coupled to the vehicle, the timestamp matrix representing a coordinate position and a timestamp of each event when the event is triggered by movement of the object relative to the DVS; scanning the events in the timestamp matrix in a predetermined scanning direction, so as to calculate a time gradient of each event in the predetermined scanning direction; creating at least one subset consisting of a first quantity of consecutive events in the predetermined scanning direction and each with a positive time gradient; calculating a spatial position of each event in each subset in accordance with intrinsic and extrinsic parameter matrices of the DVS; and calculating the TTC for the object and the vehicle corresponding to each subset in accordance with the spatial position and the timestamp of each event in the subset.

In a possible embodiment of the present disclosure, subsequent to calculating the TTC for the object and the vehicle, the method further includes determining whether there is a potential collision risk between the vehicle and the object corresponding to each subset in accordance with the TTC for the object and the vehicle corresponding to the subset.

In a possible embodiment of the present disclosure, subsequent to calculating the TTC for the object and the vehicle, the method further includes generating a vehicle collision early-warning map in accordance with the TTC for the object and the vehicle corresponding to each subset, and different pixel values in the vehicle collision early-warning map is used to represent a value of the TTC.

In a possible embodiment of the present disclosure, the predetermined scanning direction is determined in accordance with a road condition.

In a possible embodiment of the present disclosure, the calculating the spatial position of each event in each subset in accordance with the intrinsic and extrinsic parameter matrices of the DVS includes calculating the spatial position of each event in accordance with the coordinate position of each event, an installation height of the DVS and the intrinsic and extrinsic parameter matrices of the DVS.

In a possible embodiment of the present disclosure, the creating the at least one subset consisting of the first quantity of consecutive events in the predetermined scanning direction and each with the positive time gradient includes calibrating the timestamp of each event in each subset. The calibrating the timestamp of each event in each subset includes: generating a fitting curve representing a relationship between the coordinate position and the timestamp of each event in each subset; calculating a fitting time for each event in the subset in accordance with the fitting curve; and replacing the timestamp of the corresponding event with the fitting time.

In a possible embodiment of the present disclosure, the creating the at least one subset consisting of the first quantity of consecutive events in the predetermined scanning direction and each with the positive time gradient further includes: comparing values of the timestamps of the events in each subset; and selecting three events as a new subset in a descending order of the values of the timestamps.

In a possible embodiment of the present disclosure, the calculating the TTC for the object and the vehicle corresponding to each subset in accordance with the spatial position and the timestamp of each event in the subset includes: calculating, through calculus of differences, a relative speed and relative acceleration at a corresponding time point in accordance with the coordinate position and the timestamp of each of the three event in the subset; and calculating a TTC at the corresponding time point in accordance with the spatial position, the relative speed and the relative acceleration at the corresponding time point, and taking the TTC as the TTC for the object and the vehicle corresponding to the subset.

In a possible embodiment of the present disclosure, the method further includes determining pixel coordinates of a divergent center. The determining the pixel coordinates of the divergent center includes: creating a conversion relationship between a natural coordinate system and a camera coordinate system; determining position coordinates of the divergent center in the natural coordinate system; and calculating the pixel coordinates of the divergent center in accordance with the position coordinates of the divergent center in the natural coordinate system and the conversion relationship.

In a possible embodiment of the present disclosure, the method further includes: generating one timestamp matrix each time when a series of event data has been received; segmenting each timestamp matrix into a plurality of matrix blocks in accordance with a predetermined size, and calculating a coordinate position and a timestamp of a central event of all the events in each matrix block; mapping the central events in a predetermined quantity of consecutive timestamp matrices to one timestamp matrix; creating a new subset in accordance with the consecutive central events each with a positive time gradient in the predetermined scanning direction; and calculating a TTC for the object and the vehicle corresponding to the new subset.

In another aspect, the present disclosure provides in some embodiments a calculation device, including one or more processors, a memory, and one or more programs stored in the memory and executed by the one or more processors. The one or more programs includes instructions for implementing the above-mentioned method.

In yet another aspect, the present disclosure provides in some embodiments a computer-readable storage medium storing therein one or more programs including instructions. The instructions are executed by the calculation device so as to implement the above-mentioned method.

In still yet another aspect, the present disclosure provides in some embodiments a vehicle, including the above-mentioned calculation device, and a DVS coupled to the calculation device, and configured to record movement of an object relative to the DVS, trigger an event in accordance with the relative movement and generate event data.

According to the schemes for calculating the TTC for the object and the vehicle in the embodiments of the present disclosure, the timestamp matrix may be generated in accordance with an event data flow from the DVS, the predetermined scanning direction may be determined in accordance with the road condition, and the timestamp matrix may be scanned in the predetermined scanning direction to create the subset representing a movement status of the object. In addition, the spatial position of each event may be calculated in accordance with a mapping relationship of an image or three-dimensional space, and then the TTC for each object and the vehicle in a scenario may be calculated. As a result, it is able to track in real time the object at a high speed, thereby to significantly accelerate the calculation of the TTC for the object and the vehicle.

BRIEF DESCRIPTION OF THE DRAWINGS

In order to achieve the above and related objects, some descriptive aspects will be described in conjunction with the following description and drawings, and these aspects indicate various ways capable of practicing a principle of the present disclosure. All aspects and equivalent aspects thereof shall fall within the scope of the present disclosure. The above and other objects, features and advantages will become more apparent on the basis of the drawings in conjunction with the following description. Same reference signs represent a same component or element.

DETAILED DESCRIPTION

The present disclosure will be described hereinafter in more details in conjunction with the drawings and embodiments. The following embodiments are for illustrative purposes only, but shall not be used to limit the scope of the present disclosure. In contrast, the following embodiments are provided so as to facilitate the understanding of the present disclosure.

Figure 1:
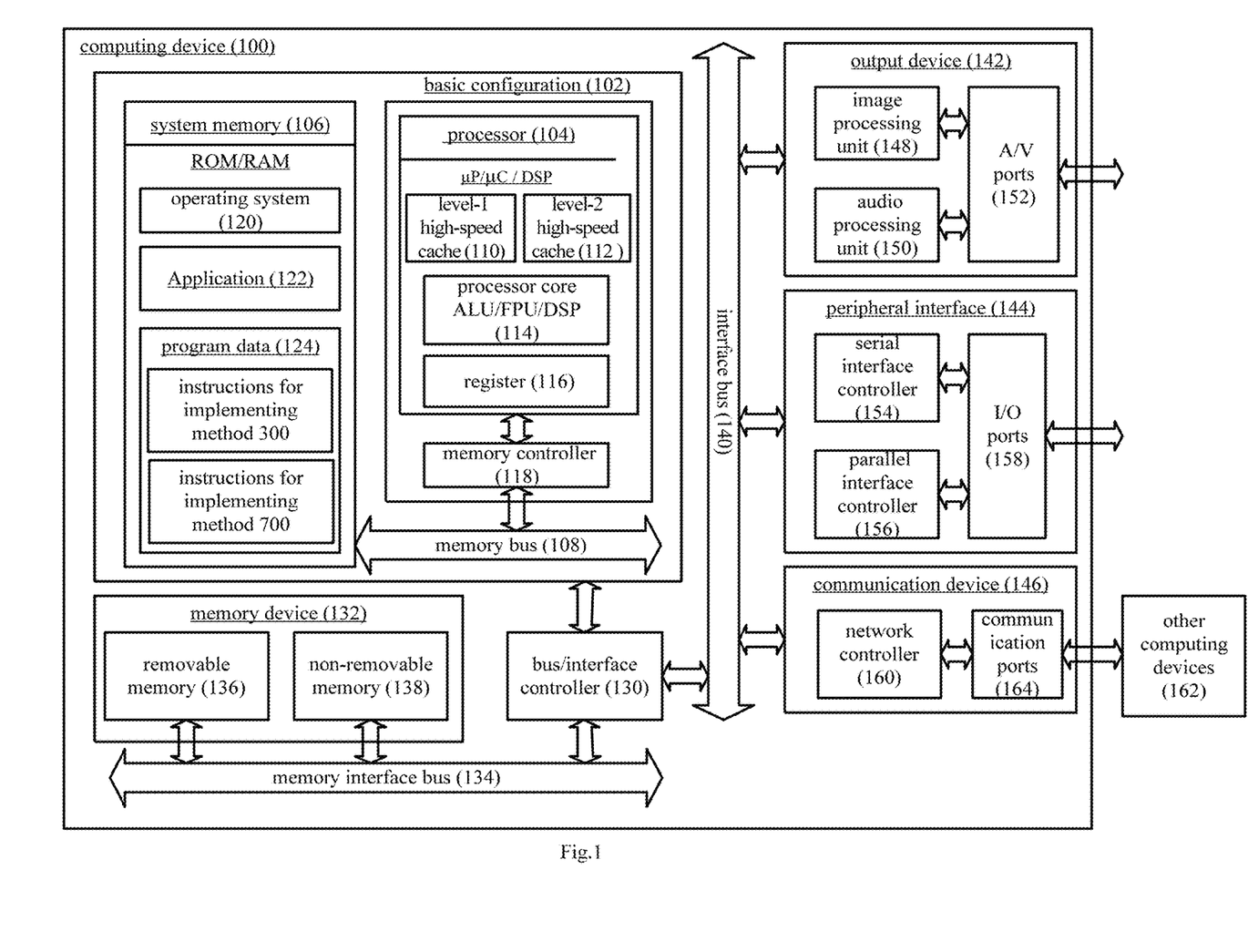
FIG. 1 is a schematic view showing a calculation device 100 according to one embodiment of the present disclosure.

FIG. 1 is a block diagram of a calculation device 100. In a basic configuration 102, the calculation device 100 typically includes a system memory 106 and one or more processors 104. A memory bus 108 may be used for the communication between the processor 104 and the system memory 106.

Depending on a desired configuration, the processor 104 may be of any type, and it may include, but not limited to, microprocessor (µP), microcontroller (µC), Digital Signal Processor (DSP), or a combination thereof. The processor 140 may include one or more levels of high-speed caches (e.g., a level-1 high-speed cache 110 and a level-2 high-speed cache 112), a processor core 114 and a register 116. The processor core 114 may include an Arithmetic Logical Unit (ALU), a Float Point Unit (FPU), a DSP core, or a combination thereof. A memory controller 118 may be used together with the processor 104, or in some embodiments of the present disclosure, the memory controller 118 may be an internal component of the processor 104.

Depending on a desired configuration, the system memory 106 may be of any type, and it may include, but not limited to, volatile memory (e.g., Random Access Memory (RAM)), non-volatile memory (e.g., Read Only Memory (ROM) or flash memory), or a combination thereof. The system memory 106 may include an operating system 120, one or more applications 122, and a program data 124. In some embodiments of the present disclosure, the application 122 may be operated using the program data 124 on the operating system. In some embodiments of the present disclosure, the calculation device 100 is configured to execute a method for calculating a TTC for an object and a vehicle, and the program data 124 may include instructions for implementing the method (e.g., a method 300 and a method 700).

The calculation device 100 may further include an interface bus 140 for the communication between various interface devices (e.g., an output device 142, a peripheral interface 144 and a communication device 146) and the basic configuration 102 via a bus/interface controller 130. The output device 142 may include a graphical processing unit 148 and an audio processing unit 150, which are configured to facilitate the communication with various external devices, e.g., display and loudspeaker, via one or more A/V ports 152. The peripheral interface 144 may include a serial interface controller 154 and a parallel interface controller 156, which are configured to facilitate the communication with the external devices, such as input devices (e.g., keyboard, mouse, pen, voice input device and image input device) or the other devices (e.g., printer or scanner) via one or more I/O ports 158. The communication device 146 may include a network controller 160, which is configured to communicate with one or more other computing devices 162 using a network communication link via one or more communication ports 164.

The network communication link may be an instance of a communication medium. Usually, the communication medium may be embodied as a computer-readable instruction, data structure or program module in a modulated data signal such as carrier or the other transmission mechanism, and it may include any information delivery medium. For the so-called modulated data signal, one or more data sets of the modulated data signal or the modulated data signal itself may be changed through encoding information in a signal. As a non-restrictive example, the communication medium may include a wired medium (e.g., wired network or private wire network), or a wireless medium (e.g., sound, Radio Frequency (RF), microwave, infrared (IR) or the like). The term "computer-readable medium" may include both the memory medium and the communication medium.

The calculation device 100 may be a personal computer, e.g., desk-top computer or laptop computer. Of course, the calculation device 100 may also be a part of a small-size portable (or mobile) electronic device, e.g., cellular phone, digital camera, PDA, Personal Media Player, wireless network browser, heat-mounted device, application-specific device, or a device including the above functions, which will not be particularly defined herein.

Recently, more and more attention has been paid to the application of a DVS in computer vision. The DVS is capable of automatically outputting information about light intensity (a timestamp and a light intensity threshold) and corresponding pixel coordinates merely when a change in the light intensity has been detected. In the embodiments of the present disclosure, the DVS is arranged in a vehicle so as to collect movement information about each object in a scenario during the driving, and the object may include, but not limited to, another vehicle, a pedestrian, a building or a street lamp. During the implementation, when there is no object moving relative to the vehicle (i.e., the DVS) in the scenario, brightness of each pixel in the DVS may not change, and no content may be displayed. However, once the movement of a certain object relative to the vehicle has been detected in the scenario (i.e., there is a light change), a pixel event (also called as event for short) may be triggered, and a time-sequence pixel event data flow of a dynamic pixel (i.e., a pixel whose brightness has changed) may be outputted.

Figure 2:
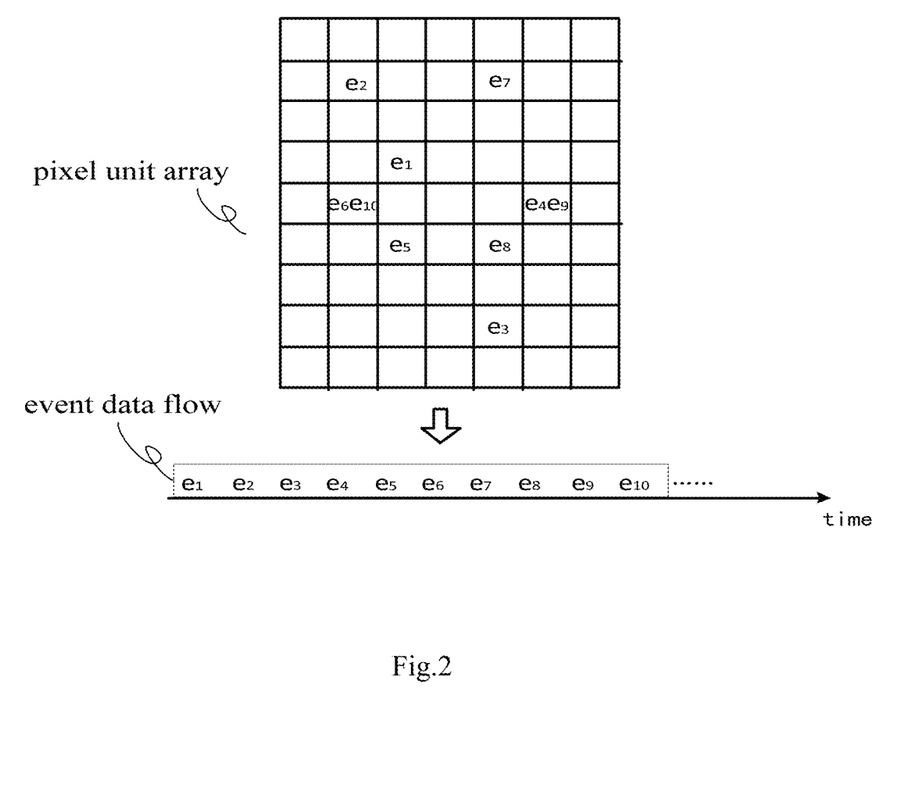
FIG. 2 is a schematic view showing the output of event data flows from a DVS according to one embodiment of the present disclosure.

FIG. 2 is a schematic view showing the event data flow outputted by the DVS. As shown in FIG. 2, a 9*7 matrix represents a pixel unit array in the DVS (it should be appreciated that, the matrix in FIG. 2 is for illustrative purpose only, and in actual use, the pixel unit array in the DVS is far greater than the size in FIG. 2). When brightness of a certain pixel unit in the array has changed, corresponding event data e may be triggered to be generated, and a coordinate position of the triggered event may be just a coordinate position of the pixel unit, where $e_i$ represents an $i^{th}$ triggered event (i=1, 2, 3, . . . ). As shown in FIG. 2, with the elapse of time, the DVS may output the event data $e_1$, $e_2$, $e_3$, $e_4$, . . . sequentially, so as to form a time-sequence event data flow. Each piece of event data $e_i$ may include the coordinate position and the timestamp of the triggered event, i.e., the event data $e_i$ may be represented as $e_i=(x_i,y_i,t_i)$, where $(x_i,y_i)$ represents a coordinate position of the $i^{th}$ triggered event, and $t_i$ represents a timestamp of the $i^{th}$ triggered event. A timestamp of an event triggered later may be greater than a timestamp of an event triggered previously, e.g., $t_2>t_1$. In other words, the event data flow has recorded pixel information about the triggered event in a chronological order.

It should be appreciated that, FIG. 2 also shows that there is more than one piece of event data at a certain coordinate position, e.g., $e_6$, $e_{10}$. It means that, the pixel unit at this coordinate position is triggered at a time point $t_6$ to generate an event $e_6$, and then triggered at a time point $t_{10}$ to generate an event $e_{10}$. In this regard, a same coordinate position may correspond to two, three or more timestamps.

In the embodiments of the present disclosure, the time-sequence pixel event data flow may be acquired by the calculation device 100 coupled to the DVS (the DVS may be connected to the calculation device in a wired or wireless manner, which will not be particularly defined herein) from the DVS, and then the method may be performed, so as to implement a scheme for calculating a TTC for an object and a vehicle.

Figure 3:
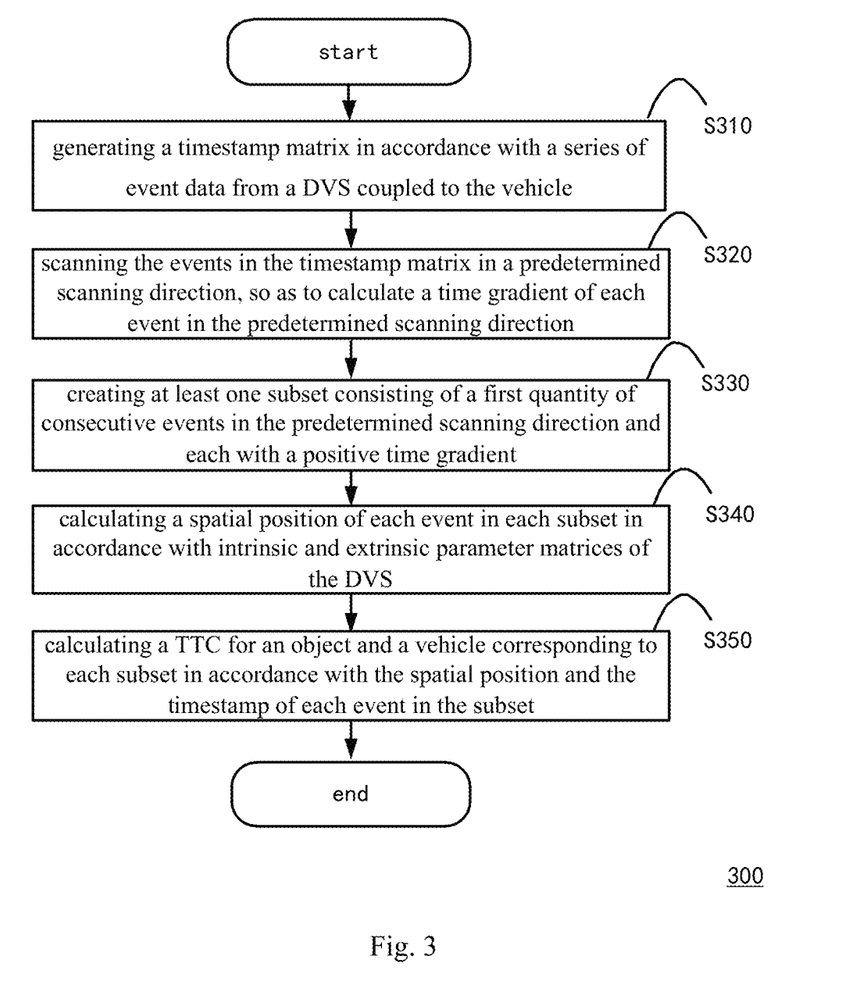
FIG. 3 is a flow chart of a method 300 for calculating a TTC for an object and a vehicle according to one embodiment of the present disclosure.

The present disclosure provides in some embodiments a method 300 for calculating a TTC for an object and a vehicle which, as shown in FIG. 3, includes the following steps.

S310: generating a timestamp matrix in accordance with event data from a DVS coupled to the vehicle. As mentioned hereinabove, an event in the event data may be triggered by the movement of the object relative to the DVS. The timestamp matrix may represent a coordinate position and a timestamp of each event when the event is triggered.

In the embodiments of the present disclosure, the series of event data from the DVS may include the coordinate position of each triggered event and the timestamp about a time point when the event is triggered. A piece of event data with a certain duration may be acquired at a regular interval so as to generate the timestamp, and a length of the series of event data will not be particularly defined herein.

A specific process of generating the timestamp matrix in accordance with the coordinate position and the timestamp of the triggered event will be described hereinafter, and the process may include the following steps 1) to 3).

1) At first, a timestamp matrix with a predetermined size may be created, and the predetermined size of the timestamp matrix may be determined in accordance with a size of a pixel unit array in the DVS. In a possible embodiment of the present disclosure, the timestamp matrix may contain all the pixel units in the array in the DVS. In the embodiments of the present disclosure, the timestamp matrix may be of a size equal to the pixel unit array. When the pixel unit array has a size of 768*640, the created timestamp matrix may also have a size of 768*640.

2) The timestamp matrix may be initialized with zero values to acquire an initialized timestamp matrix.

3) The coordinate position of the triggered event in the acquired series of event data may be searched in the initialized timestamp matrix, and then the timestamp of the corresponding triggered event may be written to the searched coordinate position to acquire the timestamp matrix. To put it simply, the values of the timestamps of the event data may be filled into the initialized timestamp matrix sequentially in a chronological order of the triggering times of the events.

As mentioned hereinabove, the pixel unit at a same coordinate position may be triggered many times to generate a plurality of events, and an up-to-date event may have better real-time performance. Hence, when one coordinate position corresponds to a plurality of timestamps, a timestamp having a maximum value may be written to the coordinate position, i.e., a timestamp of the event generated later may cover a timestamp of the event generated previously.

It should be appreciated that, instances of the generation of the timestamp matrix has been given hereinabove. In actual use, any one of them may be selected, as long as the timestamp matrix is generated in accordance with the triggering time of the event.

S320: scanning the events in the timestamp matrix in a predetermined scanning direction, so as to calculate a time gradient of each event in the predetermined scanning direction.

Figure 4A:
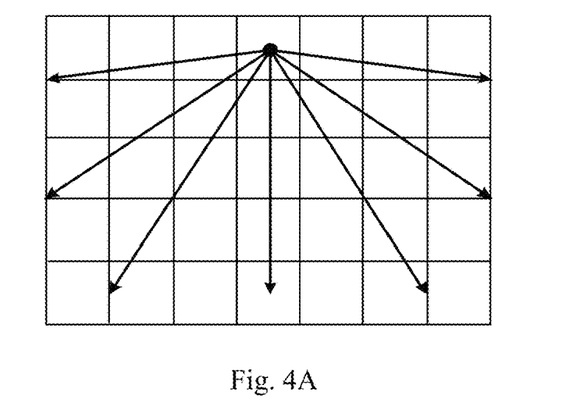
FIGS. 4A-4C show several predetermined scanning directions in a timestamp matrix according to one embodiment of the present disclosure.
Figure 4B:
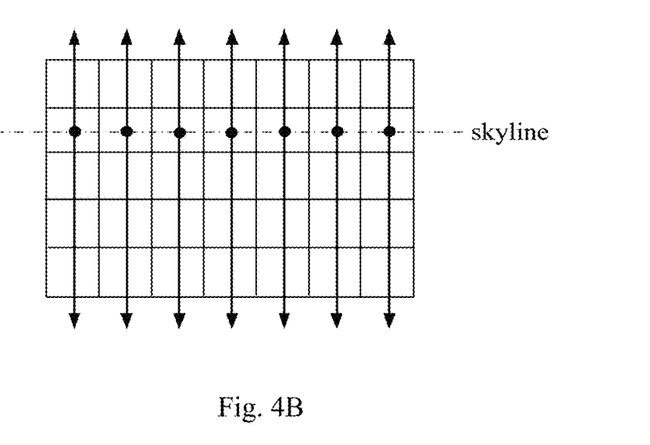
Figure 4C:
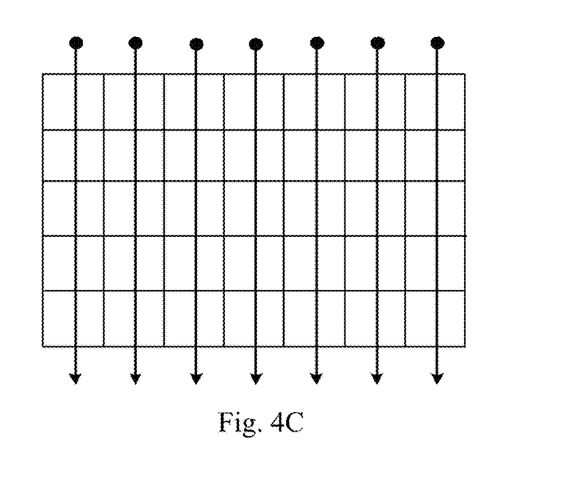

In the embodiments of the present disclosure, the predetermined scanning direction may be determined in accordance with a road condition. For example, on a flat and straight road (e.g., highway), based on a principle where a vehicle near to a current vehicle is large and a vehicle far away from the current vehicle is small, the road and the pixels of the vehicles may converge at a point at infinity. At this time, this point may be taken as a divergent center, and the predetermined scanning direction may be a radial scanning direction from the divergent center. For another example, on a highway, a country road or an urban road with many turns (e.g., a mountain road with a complex road condition), the point at infinity may change continuous (but always on a skyline). At this time, the divergent center may be a plurality of points at infinity on the skyline, and the predetermined scanning direction may be a vertical scanning direction. FIGS. 4A-4C show several predetermined scanning directions in the timestamp matrix. In these figures, blocks represent the timestamp matrix, each line with an arrow represents a scanning line (a scanning direction is indicated by the arrow), and an origin represents the divergent center. FIG. 4A shows radial scanning lines from the point at infinity, FIG. 4B shows a longitudinally-symmetrical, vertical scanning line from the skyline, and FIG. 4C shows a vertical scanning line from top to bottom. It should be appreciated that, FIGS. 4A-4C are for illustrative purposes only, and the quantity of the scanning lines in the timestamp matrix and the distribution thereof will not be particularly defined herein. In actual use, all the scanning lines need to cover all the events in the timestamp matrix.

In the embodiments of the present disclosure, subsequent to determining the predetermined scanning direction, the scanning each event in the timestamp matrix in accordance with the predetermined scanning direction may include determining pixel coordinates of the divergent center. Here, the pixel coordinates of the divergent center will be described hereinafter when the predetermined scanning direction is a radial scanning direction from the divergent center.

At first, a conversion relationship between a natural coordinate system and a camera coordinate system may be created. When the natural coordinate system with a road surface as a reference is $O_w$, and the camera coordinate system, i.e., a coordinate system of the DVS coupled to a calculation device is $O_c$, there is a rotational relationship between the two coordinate systems, i.e., $O_c = R*O_w$, where R represents an extrinsic parameter matrix (also called as a rotation matrix) acquired after calibrating a camera and is expressed as $$R = \begin{bmatrix} r_{11} & r_{12} & r_{13} \\ r_{21} & r_{22} & r_{23} \\ r_{31} & r_{32} & r_{33} \end{bmatrix}, \quad (1)$$

and each parameter in the matrix, e.g., $r_{11}$ or $r_{12}$, represents a rotation coefficient.

Next, position coordinates of the divergent center in the natural coordinate system may be determined. In a possible embodiment of the present disclosure, the coordinates of the divergent center in the natural coordinate system may be set as $P_w = [X_w, Y_w, Z_w]^T$. Because the divergent center is a point at infinity, so $Z_w$ may be deemed as infinitely great, $X_w$ may be approximate to 0, and $Y_w$ may be an installation height of the DVS.

Finally, the pixel coordinates of the divergent center may be calculated in accordance with the position coordinates of the divergent center in the natural coordinate system and the conversion relationship.

When pixel coordinates of the point at infinity is $q=[u, v, 1]^T$, the following formula may be acquired:

$$sq = KRP_w \quad (2),$$

where s represents a proportionality coefficient corresponding to the pixel coordinates, R represents the extrinsic parameter matrix of the DVS, and K represents an intrinsic parameter matrix of the DVS. The intrinsic parameter matrix may be acquired through calibrating the camera and it may be expressed as $$K = \begin{bmatrix} k_x & 0 & u_0 \\ 0 & k_y & v_0 \\ 0 & 0 & 1 \end{bmatrix}, \quad (3)$$

where $(u_0, v_0)$ represents a principal point of the DVS, and $k_x, k_y$ represent scale factors of the DVS on axes u, v.

The formula (2) may be expanded to acquire $$s\begin{bmatrix} u \\ v \\ 1 \end{bmatrix} = \begin{bmatrix} k_x & 0 & u_0 \\ 0 & k_y & v_0 \\ 0 & 0 & 1 \end{bmatrix}\begin{bmatrix} r_{11} & r_{12} & r_{13} \\ r_{21} & r_{22} & r_{23} \\ r_{31} & r_{32} & r_{33} \end{bmatrix}\begin{bmatrix} X_w \\ Y_w \\ Z_w \end{bmatrix}, \quad (4)$$

$$\text{i.e., } s\begin{bmatrix} u \\ v \\ 1 \end{bmatrix} = \begin{bmatrix} r_{11}k_x + u_0 r_{31} & r_{12}k_x + u_0 r_{32} & r_{13}k_x + u_0 r_{33} \\ r_{21}k_y + v_0 r_{31} & r_{22}k_y + v_0 r_{32} & r_{23}k_y + v_0 r_{33} \\ r_{31} & r_{32} & r_{33} \end{bmatrix}\begin{bmatrix} X_w \\ Y_w \\ Z_w \end{bmatrix}. \quad (5)$$

Then, s may be resolved, and the following formula may be acquired:

$$s = r_{31}X_w + r_{32}Y_w + r_{33}Z_w \quad (6).$$

As mentioned hereinabove, there is the following relationship among $$X_w, Y_w \text{ and } Z_w: Z_w, Y_w >> X_w \quad (7),$$

so the formula (6) may be approximate to $$s \approx r_{33}Z_w \quad (8).$$

A first equation set of the formula (5) may be approximate to $$su \approx (r_{13}k_x + u_0 r_{33})Z_w \qquad (9),$$

and a second equation set of the formula (5) may be approximate to $$sv \approx (r_{23}k_y + v_0 r_{33})Z_w \qquad (10).$$

The formula (6) may be substituted into the formulae (9) and (10), so as to acquire:

$$u|_{Z_w \to \infty} \approx r_{13}k_x \frac{Z_w}{s} + u_0 r_{33} \frac{Z_w}{s} \approx \frac{r_{13}k_x}{r_{33}} + u_0 \text{ and} \qquad (11)$$

$$v|_{Z_w \to \infty} \approx r_{23}k_y \frac{Z_w}{s} + v_0 r_{33} \frac{Z_w}{s} \approx \frac{r_{23}k_y}{r_{33}} + v_0, \qquad (12)$$

thereby to acquire the pixel coordinates $q=[u, v, 1]^T$ of the divergent center.

It should be appreciated that, when the predetermined scanning direction is a vertical scanning direction, the divergent center may be a plurality of points at infinity on the skyline. At this time, it is merely necessary to calculate one point at infinity as mentioned above, and translate it along a horizontal line to acquire a plurality of points at infinity as the divergent cents, which will not be particularly defined herein.

It should be further appreciated that, the above modes for setting the predetermined scanning direction are merely for illustrative purposes only, and the timestamp matrix may be scanned using any other scanning lines, as long as the predetermined scanning direction is determined in accordance with the road condition, which will not be particularly defined herein. In addition, based on a perspective relation, the calculation of the pixel coordinates of the divergent center may be converted into the calculation of the pixel coordinates of the point at infinity, so as to determine the scanning line.

In the embodiments of the present disclosure, subsequent to determining the pixel coordinates of the divergent center, elements in the timestamp matrix may be scanned in the predetermined direction from the divergent center using the scanning line, and the time gradient between neighboring events on each scanning line. A mode for calculating the time gradient will not be particularly defined herein. As a simplest one, a timestamp of a current event may be subtracted from a timestamp of a next event, and a resultant difference may be tanked as a time gradient of the current event.

S330: creating at least one subset consisting of a first quantity of consecutive events in the predetermined scanning direction and each with a positive time gradient.

In the embodiments of the present disclosure, the first quantity of consecutive events each with the positive time gradient may be extracted along the scanning line and form one subset (in a possible embodiment of the present disclosure, the first quantity may be not smaller than 3). This is because the DVS has such a characteristic as being sensitive to light intensity, and an image of a moving object projected onto the sensor is usually an edge image of the object. A response speed of the DVS is greater than a movement speed of the object, so it is able for each event to timely reflect information about a position change of the object. Hence, for the object at a certain movement speed, the events corresponding to the change in the edge position may be consecutive.

Figure 5:
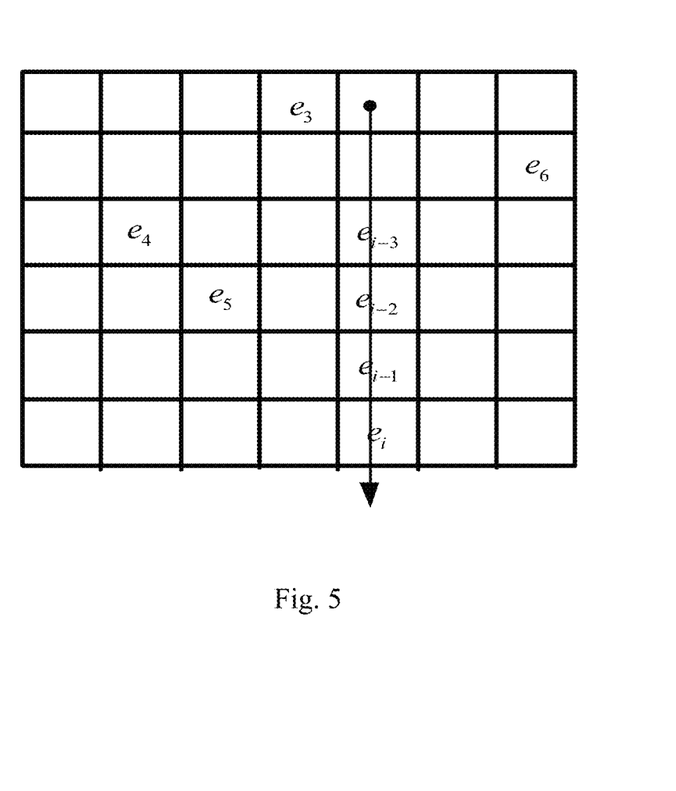
FIG. 5 is a schematic view showing a situation where the timestamp matrix is scanned according to one embodiment of the present disclosure.

FIG. 5 shows a situation where the timestamp matrix is scanned. Consecutive events $e_{i-3}, e_{i-2}, e_{i-1}, e_i$ each having the positive time gradient (i.e., with the time being incremented) and formed along one scanning line may correspond to movement information about one object in the scenario, and they may form one subset.

In a possible embodiment of the present disclosure, for each subset on the scanning line, merely three consecutive events with new timestamps may be reserved for the subsequent calculation of such information as an up-to-date position and an up-to-date speed. In the embodiments of the present disclosure, values of the timestamps of the events in each subset may be compared with each other, and three events may be selected from the subset in a descending order of the values of the timestamps as a new subset. For example, for the subset in FIG. 5, merely $e_{i-2}, e_{i-1}, e_i$ may be selected as anew subset and marked as $\{e_{i-2}, e_{i-1}, e_i\}$.

In another possible embodiment of the present disclosure, a noise may be inevitably introduced when the event data is collected, transmitted and calculated during the driving, so there may probably exist an error for the timestamp of the event. Hence, subsequent to creating the subset, it is necessary to calibrate the timestamp of each event in the subset.

The calibrating the timestamp may include: generating a fitting curve in accordance with the coordinate position and the timestamp of each event in each subset, the fitting curve representing a relationship between the coordinate position and the timestamp of the event in the subset, calculating a fitting time for each event in the subset in accordance with the fitting curve, and replacing the timestamp of the corresponding event with the fitting time.

For example, the event data may be marked as $e_i=(l_i, t_i)$, where $l_i$ represents a coordinate position of an event $e_i$ (e.g., an abscissa or ordinate), and $t_i$ represents a corresponding timestamp. Due to the perspective relationship where the object near the current vehicle is large and the object far away from the current vehicle is small, when the object is far away from the vehicle, the speed of the pixel is small, and when the object is near the vehicle, the speed of the pixel is large, so the fitting may be nonlinear fitting. As one method, a polynomial function may be used to create the fitting curve, and the following formula (13) shows one form of the polynomial function (i.e., a cubic function):

$$T_i = a_0 + a_1 l_i + a_2 l_i^2 + a_3 l_i^3 \qquad (13),$$

where $T_i$ represents a fitted occurrence time of the event $e_i$, and $a_0, a_1, a_2$ and $a_3$ are fitting coefficients. Four up-to-date events may be selected from each subset and substituted into the formula (13) to solve, and a fitting offset may be marked as $T_i - t_i$. During the implementation, each fitting coefficient in the fitting curve may be determined through minimizing a sun of absolute values of the fitting offsets, minimizing a maximum absolute value of each fitting offset, or minimizing a quadratic sum of the fitting offsets (i.e., least square method), and then the fitting time $T_i$ may be calculated and used to replace $t_i$ as the timestamp of the event after the calibration. At this time, $T_i$ may be approximately equal to $t_i$, and an influence caused by the noise may be reduced.

It should be appreciated that, the methods for performing nonlinear fitting are known to a person skilled in the art, and merely a method for performing nonlinear fitting on four event using a cubic function is described herein. Any other methods may also be used to fit a nonlinear relationship between the coordinate position and the timestamp of each event (not limited to four events), so as to calibrate the timestamp of the event. As long as the timestamp may be calibrated, any method for generating the fitting curve and fitting the time shall fall within the scope of the present disclosure and will not be particularly defined herein.

S340: calculating a spatial position of each event in each subset in accordance with intrinsic and extrinsic parameter matrices of the DVS.

In one embodiment of the present disclosure, the DVS may be a monocular sensor. At this time, when three-degree-of-freedom position information is projected to the monocular sensor, merely two-dimensional pixel information may be left, i.e., information about one dimension may be lost, so it is impossible to accurately determine the spatial position. In the embodiments of the present disclosure, the following ground constraint equation may be introduced to estimate the spatial position of each event in each subset:

$$n^T \cdot d_w + H_c = 0 \quad (14),$$

where n represents a normal vector of a road surface and is marked as $n=[0\ -1\ 0]^T$, $H_c$ represents the installation height of the DVS (i.e., a height of the DVS relative to the road surface), and $d_w$ represents the spatial position of the event.

In conjunction with the formula (2), it is able to acquire the proportionality coefficient s through s $$s = -\frac{H_c}{n^T \cdot (KR)^{-1} \cdot q}, \quad (15)$$

where R represents the extrinsic parameter matrix of the DVS, K represents the intrinsic parameter matrix of the DVS, q represents the pixel coordinate, i.e., the coordinate position of the event. In this way, the spatial position of the event may be calculated in accordance with the coordinate position of the event, the installation height of the DVS and the intrinsic and extrinsic matrices through $$d_w = -\frac{H_c}{n^T \cdot (KR)^{-1} \cdot q}(KR)^{-1}q. \quad (16)$$

For example, for the subset $\{e_{i-2}, e_{i-1}, e_i\}$ in FIG. 5, the spatial positions of the three events may be calculated through the formula (16) and marked as $d_{i-2}, d_{i-1}, d_i$ respectively.

S350: calculating the TTC for the object and the vehicle corresponding to each subset in accordance with the spatial position and the timestamp of each event in the subset.

During the implementation, three latest events may be reserved in each subset, so a relative speed and relative acceleration at a corresponding time point may be calculated through calculus of differences in accordance with the spatial positions and the timestamps of the three events in the subset. Still taking the subset $\{e_{i-2}, e_{i-1}, e_i\}$ in FIG. 5 as an example, for the three events, the spatial positions may be $d_{i-2}, d_{i-1}, d_i$ respectively and the timestamps may be $t_{i-2}, t_{i-1}, t_i$ respectively. The relative speed may be calculated through calculus of differences, e.g., as expressed by the following formulae:

$$v_i = \frac{\Delta d_i}{\Delta t_i} = \frac{d_i - d_{i-1}}{t_i - t_{i-1}} \text{ and} \quad (17)$$

$$v_{i-1} = \frac{\Delta d_{i-1}}{\Delta t_{i-1}} = \frac{d_{i-1} - d_{i-2}}{t_{i-1} - t_{i-2}}, \quad (18)$$

where $v_i$ represents a relative speed of an $i^{th}$ event, $v_{i-1}$ represents a relative speed of an $(i-1)^{th}$ event, $d_i$ represents a spatial position of the $i^{th}$ event (and so on for $d_{i-1}$ and $d_{i-2}$), $t_i$ represents a timestamp of the $i^{th}$ event (and so on for $t_{i-1}$ and $t_{i-2}$), $\Delta d_i$ and $\Delta d_{i-1}$ each represent a difference between the spatial positions, and $\Delta t_i$ and $\Delta t_{i-1}$ each represent a difference between the timestamps.

Then, the relative acceleration may be further calculated in accordance with the relative speed through $$a_i = \frac{\Delta v_i}{\Delta t_i} = \frac{v_i - v_{i-1}}{t_i - t_{i-1}}, \quad (19)$$

where $a_i$ represents relative acceleration of the $i^{th}$ event, $v_i$ represents the relative speed of the $i^{th}$ event, $v_{i-1}$ represents the relative speed of the $(i-1)^{th}$ event, $t_i$ represents the timestamp of the $i^{th}$ event, $t_{i-1}$ represents the timestamp of the $(i-1)^{th}$ event, $\Delta v_i$ represents the difference between the relative speeds, and $\Delta t_i$ represents the difference between the timestamps.

It should be appreciated that, the relative speeds of three or more events may be calculated, and here merely three events are taken as an example. When the quantity of the events in each subset is greater than 3, the relative speed may be calculated using a data fitting or differential iteration method. Both the fitting and iteration methods are known to a person skilled in the art, and thus will not be particularly defined herein.

Then, the TTC at the corresponding time point may be calculated in accordance with the spatial position, the relative speed and the relative acceleration at the corresponding time point, and it may be just the TTC for the object and the vehicle corresponding to the subset.

In a possible embodiment of the present disclosure, based on a definition of TTC, the vehicle may collide with the object after the TTC, and a distance therebetween may be zero, so a relationship among the distance, the relative speed and the relative acceleration may be expressed as $$0 = d_i + v_i \cdot TTC + 0.5 \cdot a \cdot TTC^2 \quad (20).$$

Hence, the TTC may be calculated through $$TTC = \frac{-v_i - \sqrt{v_i^2 - 2a_i d_i}}{a_i}, \quad (21)$$

where, as mentioned hereinabove, $v_i$ represents the relative speed of the $i^{th}$ event, $a_i$ represents the relative acceleration of the $i^{th}$ event, and $d_i$ represents the spatial position of the $i^{th}$ event.

The TTC acquired through calculation may be just the TTC for the object and the vehicle corresponding to the subset. It should be appreciated that, the timestamp in the above formula may also be a calibrated timestamp (i.e., $T_{i-2}, T_{i-1}, T_i$ mentioned hereinabove), which will not be particularly defined herein.

During the implementation, for each subset, whether there is a potential collision risk between the vehicle and the object corresponding to the subset may be determined in accordance with the TTC. In one possible embodiment of the present disclosure, when the TTC is a positive number, it means that there is the collision risk, and when the TTC is a negative or imaginary number, it means that there is temporarily no collision risk. In another possible embodiment of the present disclosure, it is highly likely for the vehicle to collide with the object and the collision risk may increase once the TTC is greater than a threshold (e.g., 3 s), and at this time, it may be reported to a vehicle control platform in various ways.

During the implementation, all the subsets may be traverse, and then a vehicle collision early-warning map may be generated in accordance with the TTC for each subset. Each pixel in the map may be used to represent a coordinate position of an up-to-date event in each subset, and different pixel values may be used to represent values of the TTCs corresponding to the subsets.

Figure 6:
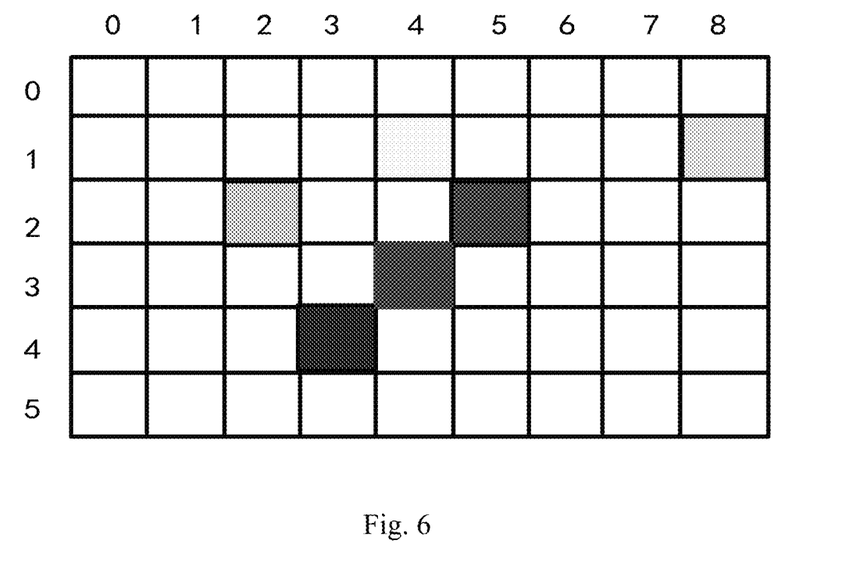
FIG. 6 is a schematic view showing an early-warning map according to one embodiment of the present disclosure.

FIG. 6 shows an early-warning map using a grayscale map, where a larger grayscale value represents a safer situation, and a smaller grayscale value represents a more dangerous situation. As shown in FIG. 6, there are six objects in a current scenario, with pixel coordinates of (1,4), (1,8), (2,2), (2,5), (3,4) and (4,3). An object represented by the pixel (4,3) may have a largest collision risk.

According to the method for calculating the TTC for the object and the vehicle in the embodiments of the present disclosure, through the important features of the data flow from the DVS (each pixel event may include a time value of the change in the light intensity of the pixel) and a mapping relationship of an image or three-dimensional space, it is able to significantly accelerate the calculation of movement speed of the object as well as the TTC for the object and the vehicle, thereby to track in real time the object at a high speed. In addition, usually each pixel vent is generated due to a position change of the object, so it is able to directly calculate the TTC in accordance with the pixel event at pixel-level precision in an image space, i.e., to measure the position at high precision. Hence, the method may be applied to some high-speed scenarios (e.g., a scenario where a bullet is fired) with rapid calculation speed and high accuracy.

It should be appreciated that, during the acquisition of the event data flow and the calculation of the TTC, the noise may be inevitably introduced, so in some other embodiments of the present disclosure, a plurality of timestamp matrices may be generated to create a subset, so as to reduce the noise, thereby to meet the requirements in a scenario where the accuracy is highly demanded.

Figure 7:
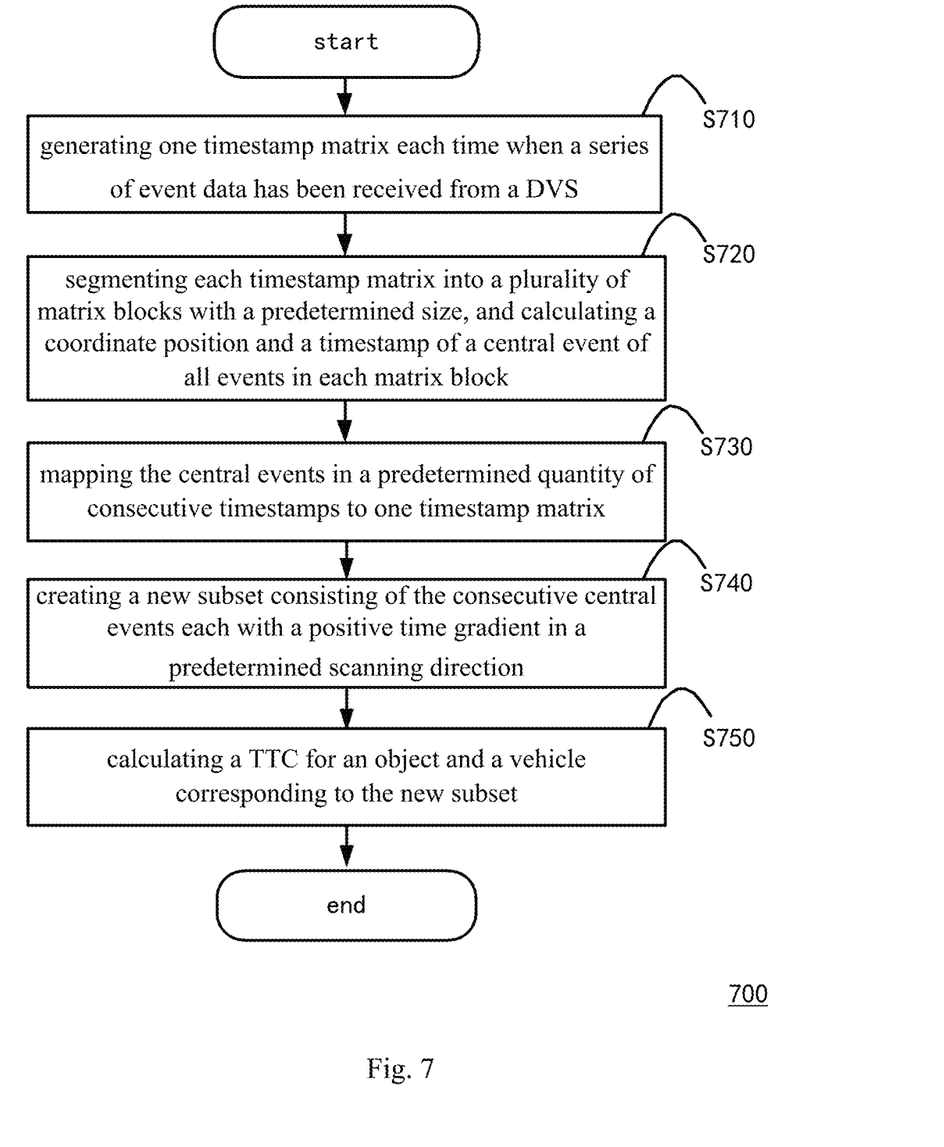
FIG. 7 is a flow chart of a method 700 for calculating a TTC for an object and a vehicle according to one embodiment of the present disclosure.

The present disclosure further provides in some embodiments a method 700 for calculating a TTC for an object and a vehicle which, as shown in FIG. 7, includes the following steps.

S710: generating one timestamp matrix each time when a series of event data has been received from a DVS. In a possible embodiment of the present disclosure, a piece of event data with a certain duration may be acquired at a regular interval to generate one timestamp matrix, i.e., a plurality of consecutive timestamp matrices may be generated. The generation of the timestamp matrix may refer to that mentioned in S310, and thus will not be particularly defined herein.

The following description will be given with respect to the generation of three consecutive timestamp matrices.

S720: segmenting each timestamp matrix into a plurality of matrix blocks with a predetermined size, and calculating a coordinate position and a timestamp of a central event of all events in each matrix block. In a possible embodiments of the present disclosure, the predetermined size may be 3*3. In this regard, the central event in each 3*3 matrix block may be calculated. For each matrix block, an average value of all the events in the matrix block may be tanked as the central event of the matrix block (it should be appreciated that, when there is no event in a certain matrix block, there may exist no central event). To be specific, an average value of the coordinate positions of all the events in the matrix block may be taken as the coordinate position of the central event, and an average value of the timestamps of all the events in the matrix block may be taken as the timestamp of the central event.

S730: mapping the central events in a predetermined quantity of consecutive timestamps to one timestamp matrix. As mentioned hereinabove, the predetermined quantity may be 3, i.e., the central events in the matrix blocks of three consecutive timestamps may be mapped to one timestamp matrix.

S740: creating a new subset consisting of the consecutive central events each with a positive time gradient in a predetermined scanning direction.

In a possible embodiment of the present disclosure, the central events in the timestamp matrix acquired through mapping may be scanned in the predetermined scanning direction, so as to calculate the time gradient of each central event in the scanning direction. Next, the consecutive central events with the positive time gradient may form the new subset. The implementation of this step may refer to that of the above-mentioned S320 and S330 in the method 300, and thus will not be particularly defined herein.

S750: calculating the TTC for the object and the vehicle corresponding to the new subset.

In a possible embodiment of the present disclosure, a spatial position of each central event in the new subset may be calculated in accordance with the intrinsic and extrinsic parameter matrices of the DVS, and then the TTC for the object and the vehicle corresponding to the new subset may be calculated in accordance with the spatial position and the timestamp of the central event. The implementation of this step may refer to that of the above-mentioned S340 and S350 in the method 300, and thus will not be particularly defined herein.

It should be appreciated that, the DVS may be a monocular sensor, a binocular sensor, or a multocular sensor. The above description has been given by taking the monocular sensor as an example. When the DVS is the binocular o multocular sensor, the spatial position of the object corresponding to each subset may be calculated in accordance with a relationship between a depth of the object and a disparity value, and then the TTC for the object and the vehicle may be calculated. Of course, the method in the embodiments of the present disclosure may also be adopted, i.e., the plurality of timestamp matrices may be generated in accordance with the event data collected by the binocular sensor and then mapped to one timestamp matrix, and then the TTC for the object and the vehicle corresponding to each subset may be calculated finally, which will not be particularly defined herein.

In a word, the present disclosure has the following advantages. (1) A time detection period depends on a clock frequency of the DVS (usually more than one hundred MHz) rather than a frame rate of a conventional camera (e.g., 30 Hz), so a detection speed of the DVS may be at a millisecond level but not traditionally limited by an exposure time and the frame rate, and the DVS may be used to detect an object moving at a speed up to ten thousands of frames per second. (2) The pixel may be directly processed to improve the position accuracy. In addition, a time of a pixel event for calculating the speed and the acceleration may be accurate to a microsecond level. Hence, the method in the embodiments of the present disclosure has significantly high calculation accuracy. (3) The processed content merely includes information about the moving object, and a large quantity of background information irrelevant to the vehicle is filtered out, so it is able to further improve the response speed. As a result, through the scheme in the embodiments of the present disclosure, it is able to solve the problems in a conventional TTC calculation method where the camera has a low sampling rate and a long image creation time and the spatial position is measured inaccurately, so the scheme has very high practical value.

In addition, considering the noise interference existing in the calculation procedure, in the embodiments of the present disclosure, a method of calibrating the timestamp and a method of creating the new subset in accordance with the plurality of consecutive timestamp matrices have been provided so as to reduce the noise interference, thereby to provide a more accurate calculation result.

It should be appreciated that, although with a large number of details, these specific details are not necessary for the implementation of the present disclosure. In some embodiments of the present disclosure, the known method, structure or technology is not shown, so as to facilitate the understanding of the present disclosure in a better manner.

It should be further appreciated that, sometimes the features of the present disclosure are described in conjunction with a single embodiment or figure, so as to facilitate the understanding of one or more aspects of the present disclosure. However, the method in the present disclosure shall not be construed as to reflect the intention that the present disclosure asks for more features than those specified in each claims. More definitely, as reflected in the appended claims, the creative aspect lies in the features less than all the features in the above-mentioned single embodiment. Hence, each claim following a specific embodiment may be definitely incorporated into the specific embodiment, and each claim itself may serve as an individual embodiment of the present disclosure.

It should be further appreciated that, modules, units or components in the above examples may be arranged in the device described in the embodiments, or in one or more devices different from the device. The modules may be combined into one module, or each module may be divided into a plurality of submodules.

It should be further appreciated that, the modules may be modified adaptively and arranged in one or more devices different from that mentioned hereinabove. The modules, units or components may be combined into one module, unit or component, or each module, unit or component may be divided into a plurality of submodules, subunits or subcomponents. Apart from the features, processes or units conflicting with each other, all the features, processes or units involved in the specification (including the appended claims, abstract and drawings) may be combined in any form. Unless otherwise defined, each feature in the specification (including the appended claims, abstract and drawings) may be replaced with a same, equivalent or similar feature.

In addition, it should be appreciated that, although some embodiments include some features in the other embodiments, the combination of the features in different embodiments may also fall within the scope of the present disclosure. For example, the features in the appended claims may be combined in any form.

In addition, some of the embodiments have been described as a combination of methods or method elements capable of being implemented by a processor of a computer system or any other device. Hence, the processor including necessary instructions for implementing the methods or the method elements may be used to form a device for implementing the methods or the method elements. In addition, the device is used to achieve functions of the elements.

Unless otherwise defined, such ordinal numerals as "first", "second" and "third" are merely used to differentiate different components rather than to represent any order, number or importance.

Although with the above embodiments, a person skilled in the art may obtain the other embodiments, which also fall within the scope of the present disclosure. In addition, it should be appreciated that, the words are selected in the present disclosure principally for readability and guidance, but shall not be construed as limiting the scope of the present disclosure. Obviously, a person skilled in the art may make further modifications and improvements without departing from the spirit of the present disclosure. The above description is for illustrative but not restrictive purposes, and the scope of the present disclosure shall be subject to the appended claims.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for calculating a Time To Collision (TTC) for an object and a vehicle for a calculation device, comprising:
generating a timestamp matrix in accordance with a series of event data from a Dynamic Vision Sensor (DVS) coupled to the vehicle, the timestamp matrix representing a coordinate position and a timestamp of each event when the event is triggered by movement of the object relative to the DVS;
scanning the events in the timestamp matrix in a predetermined scanning direction, so as to calculate a time gradient of each event in the predetermined scanning direction, wherein the predetermined scanning direction is determined in accordance with a road condition;
creating at least one subset consisting of a first quantity of consecutive events in the predetermined scanning direction and each with a positive time gradient;
calculating a spatial position of each event in each subset in accordance with intrinsic and extrinsic parameter matrices of the DVS; and
calculating the TTC for the object and the vehicle corresponding to each subset in accordance with the spatial position and the timestamp of each event in the subset, and determining whether there is a potential collision risk between the vehicle and the object corresponding to each subset in accordance with the TTC for the object and the vehicle corresponding to the subset;
generating a vehicle collision early-warning map in accordance with the TTC for the object and the vehicle corresponding to each subset, and different pixel values in the vehicle collision early-warning map is used to represent a value of the TTC.

2. The method according to claim 1, wherein the calculating the spatial position of each event in each subset in accordance with the intrinsic and extrinsic parameter matrices of the DVS comprises calculating the spatial position of each event in accordance with the coordinate position of each event, an installation height of the DVS and the intrinsic and extrinsic parameter matrices of the DVS.

3. The method according to claim 2, wherein the spatial position $P_w$ of each event is calculated through $$P_w = -\frac{H_c}{n^T \cdot (KR)^{-1} \cdot q}(KR)^{-1}q,$$

where q represents the coordinate position of the event, n represents a normal vector of a road surface, $H_c$ represents an installation height of the DVS, R represents the extrinsic parameter matrix of the DVS, and K represents the intrinsic parameter matrix of the DVS.

4. The method according to claim 3, wherein the creating the at least one subset consisting of the first quantity of consecutive events in the predetermined scanning direction and each with the positive time gradient comprises calibrating the timestamp of each event in each subset.

5. The method according to claim 4, wherein the calibrating the timestamp of each event in each subset comprises: generating a fitting curve representing a relationship between the coordinate position and the timestamp of each event in each subset; calculating a fitting time for each event in the subset in accordance with the fitting curve; and replacing the timestamp of the corresponding event with the fitting time.

6. The method according to claim 5, wherein the creating the at least one subset consisting of the first quantity of consecutive events in the predetermined scanning direction and each with the positive time gradient further comprises: comparing values of the timestamps of the events in each subset; and selecting three events as a new subset in a descending order of the values of the timestamps.

7. The method according to claim 6, wherein the calculating the TTC for the object and the vehicle corresponding to each subset in accordance with the spatial position and the timestamp of each event in the subset comprises: calculating, through calculus of differences, a relative speed and relative acceleration at a corresponding time point in accordance with the coordinate position and the timestamp of each of the three event in the subset; and calculating a TTC at the corresponding time point in accordance with the spatial position, the relative speed and the relative acceleration at the corresponding time point, and taking the TTC as the TTC for the object and the vehicle corresponding to the subset.

8. The method according to claim 7, wherein the TTC is calculated through $$TTC = \frac{-v_i - \sqrt{v_i^2 - 2a_i d_i}}{a_i},$$

where $v_i$ represents a relative speed of an $i^{th}$ event, $a_i$ represents relative acceleration of the $i^{th}$ event, and $d_i$ represents a spatial position of the $i^{th}$ event.

9. The method according to claim 8, wherein when the predetermined scanning direction is a radial scanning direction from a divergent center, the scanning the events in the timestamp matrix in the predetermined scanning direction comprises determining pixel coordinates of the divergent center.

10. The method according to claim 9, wherein the determining the pixel coordinates of the divergent center comprises: creating a conversion relationship between a natural coordinate system and a camera coordinate system; determining position coordinates of the divergent center in the natural coordinate system; and calculating the pixel coordinates of the divergent center in accordance with the position coordinates of the divergent center in the natural coordinate system and the conversion relationship.

11. The method according to claim 10, wherein the generating the timestamp matrix comprises: acquiring a series of event data from the DVS, the event data comprising a coordinate position and a timestamp of a triggered event; and generating the timestamp matrix in accordance with the coordinate position and the timestamp of the triggered event.

12. The method according to claim 11, wherein the generating the timestamp matrix in accordance with the coordinate position and the timestamp of the triggered event comprises: creating a timestamp matrix with a predetermined size, the predetermined size being determined in accordance with a size of a pixel unit array in the DVS; initializing the timestamp matrix with zero values to acquire an initialized timestamp matrix; searching the coordinate position of each triggered event in the initialization timestamp matrix; and writing the timestamp of the corresponding triggered event to the searched coordinate position to acquire the timestamp matrix.

13. The method according to claim 12, further comprising: generating one timestamp matrix each time when a series of event data has been received; segmenting each timestamp matrix into a plurality of matrix blocks in accordance with a predetermined size, and calculating a coordinate position and a timestamp of a central event of all the events in each matrix block; mapping the central events in a predetermined quantity of consecutive timestamp matrices to one timestamp matrix; creating a new subset in accordance with the consecutive central events each with a positive time gradient in the predetermined scanning direction; and calculating a TTC for the object and the vehicle corresponding to the new subset.

14. The method according to claim 13, wherein the DVS comprises one of a monocular sensor and a multocular sensor.

15. A calculation device, comprising one or more processor, a memory, and one or more programs stored in the memory and executed by the one or more processors, wherein the one or more programs comprises instructions for implementing the method according to claim 14.

16. A vehicle, comprising the calculation device according to claim 15, and a DVS coupled to the calculation device, and configured to record movement of an object relative to the DVS, trigger an event in accordance with the relative movement and generate event data.

17. A non-transitory computer-readable storage medium storing therein one or more programs, wherein the one or more programs comprises instructions, and the instructions are executed by a calculation device so as to implement the method according to claim 14.

* * * * *